US006337785B1

(12) United States Patent
Okazaki

(10) Patent No.: US 6,337,785 B1
(45) Date of Patent: Jan. 8, 2002

(54) FAULT CURRENT LIMITER

(75) Inventor: Toru Okazaki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/494,309

(22) Filed: Jan. 31, 2000

(30) Foreign Application Priority Data

| Jan. 28, 1999 | (JP) | ............................................ 11-019820 |
| Jun. 14, 1999 | (JP) | ............................................ 11-166582 |
| Aug. 25, 1999 | (JP) | ............................................ 11-237736 |

(51) Int. Cl.$^7$ ............................................... H02H 9/00
(52) U.S. Cl. .......................................... 361/19; 505/850
(58) Field of Search .............................. 361/19, 58, 111, 361/197, 63, 141; 505/850

(56) References Cited

U.S. PATENT DOCUMENTS

| 5,432,666 | A |   | 7/1995 | Hodge ........................... 361/19 |
| 5,617,280 | A | * | 4/1997 | Hara et al. ..................... 361/19 |
| 5,761,017 | A | * | 6/1998 | Hodge et al. ................... 361/19 |
| 5,912,607 | A | * | 6/1999 | Kalsi et al. .................... 335/216 |
| 6,016,094 | A | * | 1/2000 | Gerhold ..................... 361/19 X |

FOREIGN PATENT DOCUMENTS

| EP | 0 817 348 | 1/1998 |
| JP | 2-101926 | 4/1990 |
| JP | 2-269413 | 11/1990 |
| JP | 0 406 636 | 1/1991 |
| JP | 6-295833 | 10/1994 |
| JP | 8-191538 | 7/1996 |
| JP | 10-4011 | 1/1998 |
| JP | 10-501120 | 1/1998 |
| JP | 10-75528 | 3/1998 |
| WO | 96/30990 | 10/1996 |
| WO | 98/14961 | 4/1998 |

OTHER PUBLICATIONS

Okazaki et al., "A fault Current Limiter In Toroidal Form To Maximise Effective Jc", *IEEE Transactions on Applied Superconductivity,* vol. 9(2);668–671, (1999).
Meerovich et al., "Performance of BSCCO Cylinders In A Prototype Of Inductive Fault Current Limiter", *Inst. Phys. Conf. Ser.,* No. 158, pp. 1179–1182, (1997).
Patent Abstracts of Japan, vol. 1998, No. 01, Jan. 30, 1998 & JP 09 233691 A (NGK Insulators Ltd), Sep. 5, 1997.
Okazaki, T. et al., "A Fault current Limiter in Toroidal Form to Maximise Effective Jc", IEEE Transactions on Applied Superconductivity, vol. 9, No. 2, pp. 668–671, Jun. 1999.
Patent Abstract of Japan vol. 013, No. 259 (E–773), Jun. 15, 1989 & JP 01 055016A (Mitsubishi Electric Corp.), Mar. 2, 1989.

* cited by examiner

Primary Examiner—Edward H. Tso
(74) *Attorney, Agent, or Firm*—Foley & Lardner

(57) ABSTRACT

A superconducting fault current limiter is provided which is capable of ensuring a sufficient impedance for restricting an excessive current flow caused by an accident and completely satisfying a canceling condition of a magnetic field during normal operation without using an iron core.

The fault current limiter includes first superconducting coils and second superconducting coils including windings of superconducting lines. First superconducting coils are electrically connected in series with second superconducting coils. First superconducting coils and second superconducting coils generate magnetic fields in opposite directions by application of currents. The fault current limiter further includes a component selected from a group consisting of a resistor and an inductor, the component being electrically connected in parallel with second superconducting coils. First superconducting coils and second superconducting coils are alternately arranged in a ring form such that a coil axis is circular.

56 Claims, 8 Drawing Sheets

FAULT CURRENT LIMITER

BACKGROUND OF THE INVENTION

1. Field of the Invention

The present invention relates to fault current limiters, and more particularly to a fault current limiter using a superconducting coil.

2. Description of the Background Art

A fault current limiter is used in an electric power circuit for instantly restricting excessive current flow caused by a fault or accident such as a short-circuit. Recently, a fault current limiter using a superconductor has been developed. The fault current limiter using the superconductor utilizes a mechanism for bringing the superconductor from a superconducting state to a normal conducting state in case of an accident such as a short-circuit.

A structure of a superconducting fault current limiter of an induction type is disclosed for example in T. Okazaki, P. D. Evans, "A Fault Current Limiter in Toroidal Form to Maximize Effective Jc", *Proceedings of the 1998 Applied Superconductivity Conference*, California, Sep. 13–18, 1998. The superconducting fault current limiter of the induction type includes a primary coil having a normal conductor connected to an electric power system and a secondary coil having a superconductor with both ends short-circuited. The secondary coil is designed to be in the superconducting state during normal operation. In this state, a magnetic flux generated by the primary coil is cancelled by that generated by an induced current flowing through the secondary coil. If excessive current flows through the primary coil due to accidental short circuit or the like, the current flowing through the secondary coil also increases. When the superconductor of the secondary coil quenches due to the excessive current flow, a quenching resistance (a resistance after transition to the normal conducting state) is generated in the secondary coil. Thus, an induced current flowing through the secondary coil decreases. Accordingly, the magnetic flux generated by the primary coil is not sufficiently cancelled, and an impedance of the fault current limiter increases. The increased impedance restricts current flow generated in case of the accident.

The superconductor used for the superconducting fault current limiter operating as described above is required to have a high critical current value during normal operation and a high quenching resistance value in case of accidental short circuit or the like (when excessive current flow is caused). For the superconducting fault current limiter of the induction type which is disclosed in the above mentioned reference, it is proposed that a plain coil is arranged in a toroidal form. A primary coil is formed of a pancake coil including a copper wire of a normal conductor, whereas a secondary coil is formed of a ring including oxide superconductors of thin films provided on either side of a zirconia substrate. The primary and secondary coils are alternately arranged such that a coil axis is circular. Thus, the coils are arranged in the toroidal form. Such structure allows a magnetic field to be parallel with a surface of the superconductor and a critical current value of the superconductor to be maximum during normal operation. When excessive current flow is caused due to an accident or the like, the generated magnetic field is perpendicular to the surface of the superconductor and a resistance value of the superconductor is maximum. Thus, an amount of the superconductor required for a designed current value during normal operation becomes minimum, and the resistance value of the superconductor in the case of the accident increases. As a result, excessive current flow due to the accident in the fault current limiter of the induction type is effectively prevented.

In Japanese Patent Laying-Open No. 2-101926, a structure of a superconducting fault current limiter of a noninduction type is disclosed which has two superconducting coils connected in parallel. In the superconducting fault current limiter, one superconducting coil is brought into a normal conducting state, so that the other superconducting coil generates an inductance for restricting excessive current flow in the case of the accident.

In the conventional superconducting fault current limiter of the induction type as described in the above mentioned reference, however, an iron core must be positioned at axes of the primary and secondary coils arranged in the toroidal form. This is because it is difficult to ensure sufficient impedance in the case of the accident if the iron core is not used in the fault current limiter of the induction type. In the conventional superconducting fault current limiter disclosed in the above mentioned reference, after the secondary coil is brought from the superconducting state into the normal conducting state, a resistance value of the secondary coil increases in accordance with a current value of the primary coil. Assuming that the resistance value of the secondary coil is infinite, the fault current limiter disclosed in the reference can be considered to be a simple inductor. Thus, to ensure moderate impedance in the case of the accident in accordance with Faraday's law, the inductor must suitably be designed only on the side of the primary coil. As a result, to ensure a prescribed impedance required for restricting excessive current flow in the case of accident, the size of the iron core positioned at the axis of the coil must be increased. This disadvantageously increases a weight of the fault current limiter per se. In addition, an iron core in a prescribed shape must be inserted as axes of a plurality of coils arranged in the toroidal form. This results in a complicated structure of the fault current limiter.

Further, in the superconducting fault current limiter of the induction type disclosed in the reference, the primary and secondary coils are inductively coupled. As a result, ampere turns of the primary and secondary coils do not completely match because of an exciting current or leakage flux. Thus, a magnetic field cannot completely be cancelled.

On the other hand, in a superconducting fault current limiter of a noninduction type disclosed in Japanese Patent Laying-Open No. 2-101926, one of two superconducting coils connected in parallel must always be maintained in the superconducting state. Thus, the fault current limiter must securely be designed to allow a sufficient margin to always maintain one superconducting coil in the superconducting state. In addition, to restrict current flow in the case of the accident by the inductance, a suitable approach must be taken such as to increase the number of turns of the coil such that the inductance attains to an optimum value.

SUMMARY OF THE INVENTION

An object of the present invention is to provide a fault current limiter capable of ensuring a sufficient impedance for restricting excessive current flow caused by an accident without using an iron core.

Another object of the present invention is to provide a compact fault current limiter capable of satisfying a canceling condition of a magnetic field as well as possible during normal operation and allowing a small residual impedance during normal operation.

The fault current limiter according to one aspect of the present invention includes first and second superconducting coils including windings of superconducting lines. The first superconducting coil is electrically connected in series with the second superconducting coil. The first and second superconducting coils generate magnetic fields in opposite directions by current flow. The fault current limiter of the present invention further includes a component selected from a group consisting of a resistor and an inductor, the component being electrically connected in parallel with the second superconducting coil.

In the fault current limiter of the present invention, as the first and second superconducting coils generate magnetic fields in opposite directions during normal operation, so that the magnetic field in the direction of a coil axis is cancelled. If excessive current flow is caused by an accident, one of the first and second superconducting coils quenches, and a resistance value thereof increases. At the time, current is shunted and flows through the component electrically connected in parallel with one superconducting coil. Thus, values of current flowing through the first and second superconducting coils differ and the canceling condition of the magnetic field is not satisfied. As a result, the magnetic field is generated in the direction of the coil axis, that is, the magnetic field is generated perpendicularly to a surface of a superconductor. Thus, the resistance value of the quenched superconducting coil further increases. By the magnetic field generated perpendicularly to the surface of the superconductor, the other superconducting coil is also brought into a normal conducting state, thereby resulting in a large quenching resistance by the current flowing through the coil and magnetic field thereof. Thus, an overall impedance for restricting excessive current flow caused by the accident can be determined by the quenching resistance value of the superconducting coil without using an iron core. Unlike the conventional superconducting fault current limiter of an induction type, an overall size of the fault current limiter can be designed without any restriction by Faraday's law. As the iron core is not used, a compact fault current limiter is achieved with reduced weight.

In the fault current limiter of the present invention, the first superconducting coil is electrically connected in series with the second superconducting coil, so that the same amount of magnetic field can accurately be generated in the direction of the coil axis and the canceling condition of the magnetic field can be satisfied completely. It is a well known fact that the superconductor indicates the largest critical current value when a magnetic field is zero.

As the first superconducting coil is electrically connected in series with the second superconducting coil, the canceling condition of the magnetic field can be satisfied even when a direct current flows.

In one embodiment of the fault current limiter according to the above described first aspect of the present invention, the first and second superconducting coils are preferably arranged in a cylindrical shape such that the coil axis is linear, that is, in a solenoid form. The first and second superconducting coils may be arranged such that the coil axis is a curve.

A still more compact fault current limiter is obtained if the first and second superconducting coils are arranged in a cylindrical shape such that the coil axis is linear.

Preferably, the fault current limiter according to the above mentioned first embodiment further includes a third coil connected in series with the first and second superconducting coils and arranged at an end in the direction of the coil axis.

Such structure allows unevenness of the magnetic field at the end of the solenoid form in the direction of the coil axis to be corrected by the third coil to avoid adverse affect on a current-limiting property.

When the first and second superconducting coils are arranged such that the coil axis is a curve, preferably, the fault current limiter according to the above mentioned one aspect of the present invention further includes a third coil connected in series with the first and second superconducting coils and arranged at the end in the direction of the coil axis and a fourth coil connected in series with the first and second superconducting coils and arranged at a portion having a relatively small curvature of the curve. In this case, the fault current limiter may include only the third coil connected in series with the first and second superconducting coils and arranged at the portion having the relatively small curvature of the curve of the curve.

In this case, the uneven magnetic field at the portion with a small curvature, for example, at a bent portion of the axis, is corrected by the coil arranged at the portion having a small curvature to prevent adverse affect on the current-limiting property.

In the fault current limiter having the above described structure, the third or fourth coil may be a normal conducting coil including a winding of a normal conducting line or a superconducting coil including a winding of a superconducting line.

When the third or fourth coil is a superconducting coil including a winding of a superconducting line, a critical current value of the third or fourth coil is preferably set larger than critical current values of the first and second superconducting coils.

Thus, when excessive current flow is caused by the accident at the end in the direction of the coil axis or at the portion having a relatively small curvature, even if the first and second superconducting coils quench and are brought into the normal conducting state, the third or fourth coil does not quench. Accordingly, the coil arranged at the end in the direction of the coil axis or at the portion having a relatively small curvature is prevented from adversary affecting the current-limiting property. Thus, only a central portion of the first and second superconducting coils arranged in the solenoid form generating a uniform magnetic field affects the current-limiting operation. As a result, an equal current load is applied to each of the first and second superconducting coils, and a uniform magnetic field is obtained by each of the first and second superconducting coils.

Preferably, the third or fourth coil has an ampere turn appropriately the same as those of the first and second superconducting coils.

In this case, if the ampere turn of the third or fourth coil is the same as those of the first and second superconducting coils, the number of the turns of the third or fourth coil may differ from those of the first and second conducting coils and a current value of the third or fourth coil may differ from those of the first and second superconducting coils.

When the third or fourth coil includes a winding of a superconducting line, a cross sectional area of the superconducting line forming the third or fourth coil may be larger than that of the superconducting line forming the first and second superconducting coil.

In this case, the performance of the third or fourth coil arranged at the end in the direction of the coil axis or at the portion having a relatively small curvature can be enhanced. By arranging the superconducting coil which corrects unevenness or disorder of the magnetic field at the end or at the portion having a small curvature as the third or fourth coil, the coil may contribute to the current-limiting operation.

In another embodiment of the fault current limiter according to the above mentioned one aspect of the present invention, the first and second superconducting coils are preferably arranged in a ring such that the coil axis is circular, that is, arranged in a toroidal form.

Preferably, in the fault current limiter according to the above mentioned one aspect of the present invention, the resistance value of the resistor or the inductance of the inductor are adjustable.

As shunting of current to the resistor or inductor from the previously quenched superconducting coil can be controlled, the time at which the canceling condition of the magnetic field fails to be satisfied or a degree thereof can be controlled.

A fault current limiter according to another aspect of the present invention includes first and second superconducting coils including windings of superconducting lines. The second superconducting coil is short-circuited. The second superconducting coil is arranged to generate a magnetic field in a direction opposite to that generated by the first superconducting coil.

As the second superconducting coil is short-circuited and arranged in the fault current limiter according to the above mentioned another aspect, when an alternating current is applied to the first superconducting coil, the first and second superconducting coils generate magnetic fields in opposite directions during normal operation. Thus, the magnetic field in the direction of the coil axis is nearly cancelled. When excessive current flow is caused by an accident, the first superconducting coil is quenched. Thus, an impedance of the fault current limiter for restricting excessive current flow caused by the accident is ensured by a quenching resistance value of the first superconducting coil. Unlike the conventional fault current limiter, an iron core is not necessary for ensuring the impedance. As a result, a compact fault current limiter with reduced weight is obtained.

If a critical current value of the second superconducting coil is smaller than that of the first superconducting coil, the second superconducting coil quenches and its resistance value increases faster than the first superconducting coil when excessive current flow is caused by the accident. This differentiates the current values of the first and second superconducting coils, so that the canceling condition of the magnetic field fails to be satisfied. The magnetic field is generated in the direction of the coil axis of the first and second superconducting coils. As the magnetic field is generated perpendicularly to a surface of a superconductor, the resistance value of the quenched second superconducting coil further increases. The first superconducting coil is also brought into a normal conducting state by the magnetic field generated perpendicularly to the surface of the superconductor. Thus, the first superconducting coil comes to have a larger quenching resistance by the current applied to the coil and the magnetic field thereof. As a result, an overall impedance for restricting excessive current flow caused by the accident can be determined by the quenching resistance value of the superconducting coil without using the iron core.

In the fault current limiter according to the above described one aspect of the present invention, the first and second superconducting coils are connected in series, and a component selected from a group consisting of a resistor and an inductor is electrically connected in parallel with the second superconducting coil. Voltages during normal operation and at the time of the accident are applied to the first and second superconducting coils and the component. Particularly, as excessive current flow and voltage are caused by the accident, a high voltage is also generated at each portion between the first and second superconducting coils and the component. Accordingly, sufficient insulation is required at each portion to prevent the dielectric breakdown when the high voltage is generated by the accident. However, in the fault current limiter according to another aspect, basically, only first superconducting coil is connected to a power supply source, and no resistor or inductor is provided. Thus, only a limited portion is subjected to the high voltage generated by the accident. Thus, as the number of portions which must strictly be designed to ensure insulation of the excessive voltage generated by the accident decreases, the fault current limiter can more freely be designed. In addition, a structure of the fault current limiter can be simplified.

In the fault current limiter according to the above described another aspect, the second superconducting coil may include a plurality of superconducting coils each independently short-circuited.

In the fault current limiter according to the above described another aspect, the second superconducting coil may electrically be connected to the first superconducting coil such that a potential of the second superconducting coil is fixed with respect to the first superconducting coil.

When a potential of the second superconducting coil is not fixed, floating electric charges may accumulate in the second superconducting coil. Such accumulation of floating electric charges makes a magnetic field concentrate around the second superconducting coil. As a result, a breakdown voltage may be caused in the second superconducting coil. Thus, in the fault current limiter according to the above described another aspect, the potential of the second superconducting coil is fixed with respect to the first superconducting coil as described above, so that the above mentioned unexpected breakdown voltage is prevented.

In the fault current limiter according to the above described another aspect, the second superconducting coil may be connected to the first superconducting coil through a component selected from a group consisting of a resistor and an inductor.

In this case, the fixed potential of the second superconducting coil can arbitrarily be set by adjusting the component.

Preferably, in the fault current limiter according to the above described another aspect of the present invention, a resistance value of the resistor or an inductance of the inductor is adjustable.

Thus, shunting of the current from the first quenched superconducting coil to the component can be controlled, so that a time at which the canceling condition of the magnetic field fails to be satisfied and a degree thereof can be controlled.

In the fault current limiter according to the above described another aspect, the second superconducting coil may include a plurality of superconducting coils. The plurality of superconducting coils are electrically connected in series and may form a circuit having one and the other ends, which may be short-circuited.

When excessive current is applied to the circuit having the plurality of superconducting coils at the time of the accident, if one of the plurality of superconducting coils is quenched, a current flowing through the overall circuit can rapidly be reduced. Thus, an intensity of the magnetic field generated by all of the plurality of superconducting coils can surely be reduced. As a result, the canceling condition of the magnetic field in the fault current limiter immediately fails to be satisfied, so that the fault current limiter can surely be operated in a short period of time when the accident is caused.

In the fault current limiter according to the above-described another aspect, the above mentioned circuit may electrically be connected to the first superconducting coil such that a potential of the circuit is fixed with respect to the first superconducting coil.

Thus, the floating electric charges are prevented from locally concentrating in the circuit including the plurality of superconducting coils when the high voltage is generated by the accident. As a result, the problem associated with the dielectric breakdown is prevented in the circuit.

In the fault current limiter according to the above described another aspect, the second superconducting coil may include third to sixth superconducting coils. The third and fourth superconducting coils are electrically connected in series to form a first circuit having one end and the other end. One and the other ends of the first circuit may be short-circuited. The fifth and sixth superconducting coils are electrically connected in series to form a second circuit having one end and the other end. One and the other ends of the second circuit may be short-circuited.

With this structure, the plurality of coils as the second superconducting coils can form a plurality of circuits of the first and second circuits, which are short-circuited. When a portion of the plurality of superconducting coils forming the circuit quenches, the use of the plurality of circuits allows the impact by the quench to be rapidly transferred to another superconducting coil forming the circuit.

When the plurality of superconducting coils of the second superconducting coil form a single circuit, a single potential is determined for the single circuit. On the other hand, when the first superconducting coil includes the plurality of superconducting coils, different potentials are determined for the plurality of superconducting coils. Among combinations of oppositely arranged first and second superconducting coils, some combination has a large potential difference of the first and second superconducting coils, thereby making a design for insulation difficult. However, the above described structure allows a potential to be set for each of the first and second circuits, so that the potential difference of the first and second superconducting coils is prevented from being an excessive value.

In addition, the above described structure allows each of the first and second circuits to be designed separately, so that the fault current limiter can more freely be designed.

In the fault current limiter according to the above mentioned another aspect, the first and second circuits may electrically be connected to the first superconducting coil such that potentials of the first and second circuits are fixed with respect to the first superconducting coil.

Thus, floating electric charges are prevented from locally concentrating in the first and second circuits including the plurality of superconducting coils when the high voltage is generated by the accident. Accordingly, the problem associated with the dielectric breakdown is prevented in the first and second circuits.

In the fault current limiter according to the above described another aspect, the first and second superconducting coils may be arranged in a cylindrical shape such that the coil axis is linear.

In the fault current limiter according to the above described aspect, the first and second superconducting coils may be arranged such that the coil axis is a curve.

In the fault current limiter according to the above described aspect, the first and second superconducting coils may be arranged in a ring such that the coil axis is circular.

In the fault current limiter according to the above described first or another aspect of the present invention, the first and second superconducting coils are alternately arranged.

The above described structure allows the magnetic field to be generated in parallel with and perpendicularly to the surface of the superconductor during normal operation and in the case of the accident, respectively, so that an efficient fault current limiter is achieved. Particularly, the magnetic field is efficiently generated perpendicularly to the surface of the superconductor in the case of the accident, so that a larger resistance value is obtained after transition to the normal conducting state. As a result, a more compact fault current limiter with respect to a required resistance value is achieved.

In the fault current limiter according to the above described one or another aspect of the present invention, the superconducting coil is preferably formed of a superconductor spirally arranged on a plane.

In the fault current limiter according to the above described one or another aspect of the present invention, preferably, the first and second superconducting coils include windings of superconducting lines wound in opposite directions such that the first and second superconducting coils generate magnetic fields in opposite directions.

The first and second superconducting coils include windings of superconducting lines wound in the same direction. The first and second superconducting coils may be arranged to generate magnetic fields in opposite directions.

In this case, only a single type of coil may be prepared by using windings of the superconducting lines wound in the same direction, so that the number of components is reduced.

In the fault current limiter according to the above described one or another aspect of the present invention, a critical current value of the first superconducting coil is preferably higher than that of the second superconducting coil.

Thus, when an excessive current begins to flow in the case of the accident, the canceling condition of the magnetic field fails to be satisfied if the second superconducting coil quenches first. In this case, even if the first superconducting coil quenches first, the canceling condition of the magnetic field does not fail to be satisfied. Consequently, it is not expected that a speed of transition to the quenched state by the magnetic field is accelerated.

The transition to the normal conducting state is caused by a slight transition toward the normal conducting state of the second superconducting coil, so that the current is applied to the component for shunting current. The shunting of current makes the complete canceling condition of the magnetic field fail to be satisfied and, the magnetic field is generated in the direction of the coil axis, that is, in the direction perpendicular to the surface of the superconductor. As a result, a critical current value of the entire superconducting coil decreases and a current-limiting operation is rapidly performed. Unlike local heat generation, the magnetic field can be instantly applied to a large area. The application of the magnetic field can rapidly bring the entire superconductor into the normal conducting state, thereby permitting unevenness in a property of the superconductor which is even worse than in the conventional case.

In the fault current limiter according to the above described one or another aspect, the superconducting line preferably includes an oxide superconductor.

One preferred embodiment of the fault current limiter of the present invention includes first and second superconducting coils including windings of superconducting lines. The first superconducting coil is electrically connected in series with the second superconducting coil. The first and second superconducting coils generate magnetic fields in opposite directions when current is applied. The first and second superconducting coils are arranged in a ring such that a coil axis is circular. The first and second superconducting coils are alternately arranged and formed by oxide superconductors spirally arranged on a plane.

Another preferred embodiment of the fault current limiter of the present invention includes first and second superconducting coils having windings of superconducting lines. The first superconducting coil is electrically connected in series with the second superconducting coil. The first and second superconducting coils generate magnetic fields in opposite directions when current is applied. The first and second superconducting coils are arranged in a cylindrical shape such that the coil axis is linear, that is, in a solenoid form. The first and second superconducting coils are alternately arranged and formed of oxide superconductors spirally arranged on a plane. Further, a third coil is provided which is connected in series with the first and second superconducting coils and arranged at an end in the direction of the coil axis.

Another preferred embodiment of the fault current limiter of the present invention includes first and second superconducting coils including windings of superconducting lines. The first and second superconducting coils are arranged in a cylindrical shape such that a coil axis is linear. The second superconducting coil is short-circuited and arranged to generate a magnetic field in a direction opposite to that of the magnetic field generated by the first superconducting coil. The second superconducting coil includes third to sixth superconducting coils. The third and fourth superconducting coils are electrically connected in series to form a first circuit having one end and the other end. One and the other ends of the circuits are short-circuited. The fifth and sixth superconducting coils are electrically connected in series to form a second circuit having one end and the other end. One and the other ends of the second circuit are short-circuited. The superconducting coils are formed of oxide superconductors spirally arranged on a plane.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
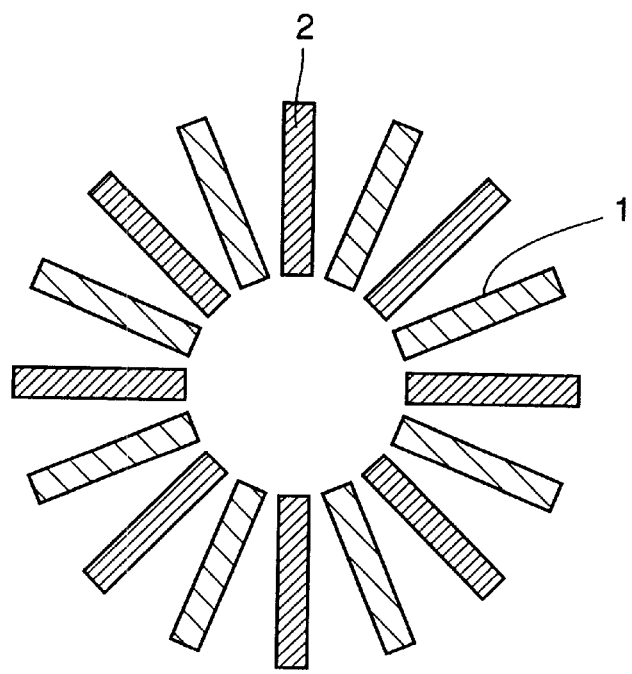
FIG. 1 is a plan view showing an arrangement of superconducting coils in a first embodiment of a superconducting fault current limiter according to the present invention.

As shown in FIG. 1, a fault current limiter includes a plurality of plain first superconducting coils 1 and a plurality of plain second superconducting coils 2 formed of windings of superconducting lines. FIG. 1 shows side surfaces of the first and second superconducting coils 1 and 2, and the first and second superconducting coils 1 and 2 are arranged in a circular shape such that a coil axis defines a circle. The first superconducting coils 1 and second superconducting coils 2 are alternately arranged. First superconducting coils 1 and second superconducting coils 2 include windings of superconducting lines wound in opposite directions. First and second superconducting coils 1 and 2 are electrically connected in series. First and second superconducting coils 1 and 2 are plain superconducting coils of oxide superconductors each spirally arranged on a plane. Oxide superconducting thin films may be spirally formed on either side of a substrate in a ring form, so that a double pancake coil is formed. Alternatively, first and second superconducting coils 1 and 2 may be formed of double pancake coils having general oxide superconducting lines. Any configuration other than the double pancake configuration may be employed.

Figure 2:
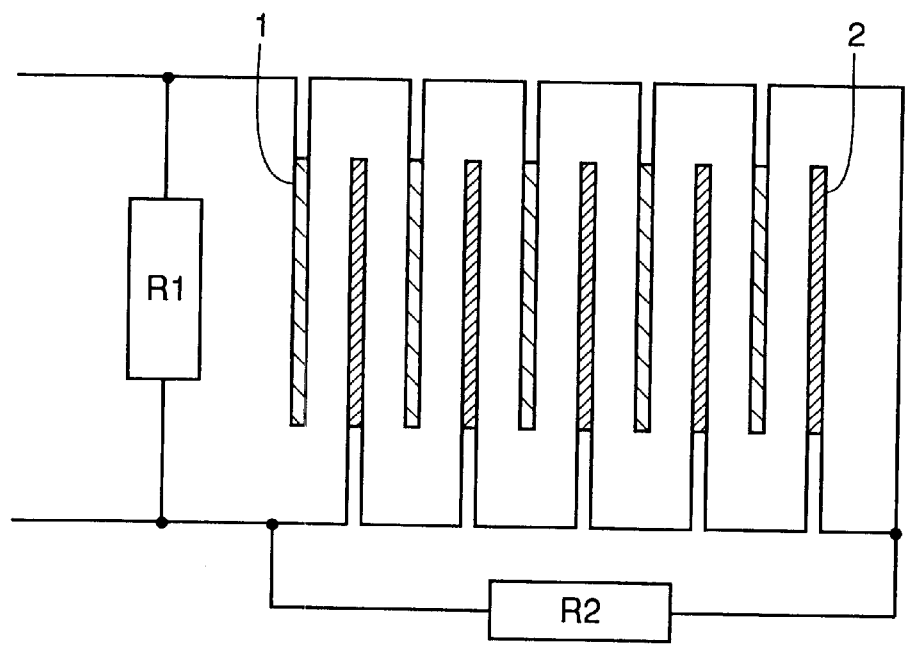
FIG. 2 is a diagram showing the superconducting coils arranged in accordance with the arrangement shown in FIG. 1.

Referring to FIG. 2, first superconducting coils 1 are connected in series and second superconducting coils 2 are connected in series, which are in turn connected in series. A resistor R2 is connected in parallel with the plurality of second superconducting coils 2 connected in series. Resistor R2 has a value higher than an overall impedance ZSC2 of second superconducting coil 2 in a superconducting state. Impedance ZSC2 is extremely small in the superconducting state. A critical current value of superconducting coil 2 is slightly lower than that of first superconducting coil 1. Although the coils are arranged in a solenoid form in FIG. 2, actually, both ends are connected together to provide a coil in a toroidal form as shown in FIG. 1. Resistor R1 is used for shunting current when an accident or fault is caused, and is not essential to the fault current limiter of the present invention.

Figure 3:
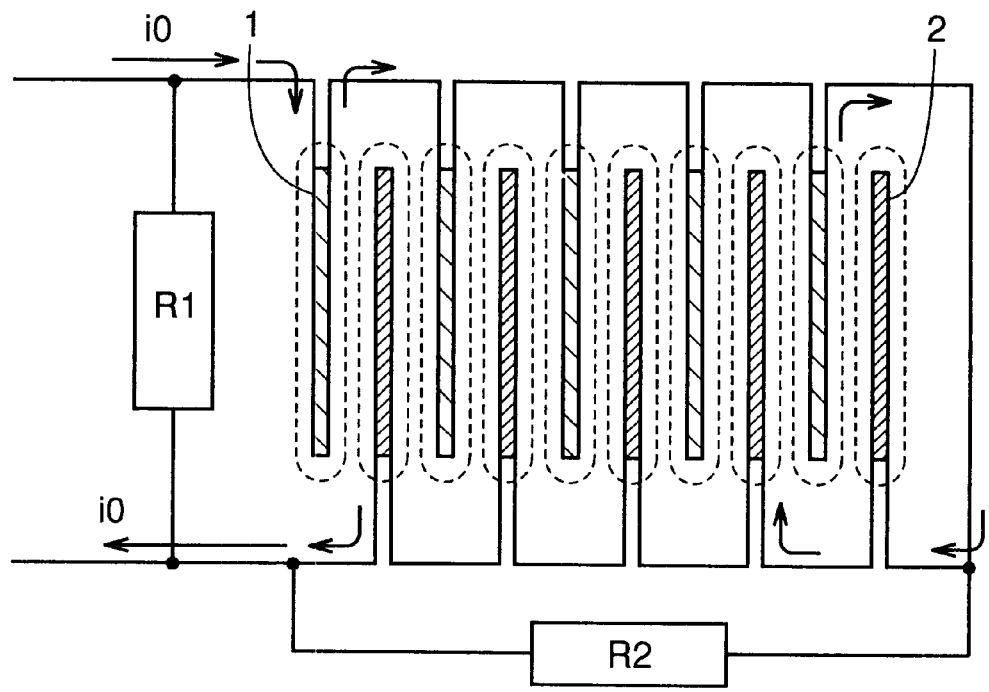
FIG. 3 is a diagram showing a direction of current applied during normal operation and corresponding to FIG. 2.
Figure 4:
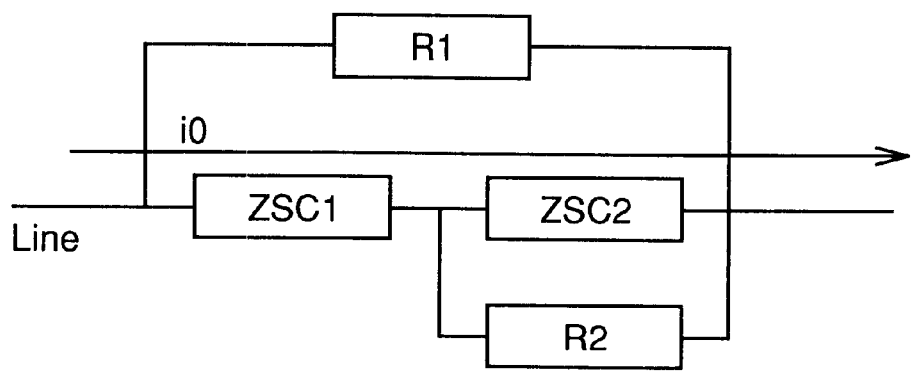
FIG. 4 is a diagram of an equivalent circuit showing a direction of the current applied during normal operation and corresponding to FIG. 3.

First and second superconducting coils 1 and 2 are both in the superconducting state during normal operation as shown in FIG. 3. Thus, impedance ZSC1 of the first superconducting coil 1 and impedance ZSC2 of the second superconducting coil 2 in the superconducting state are extremely small. Resistance values of resistors R1 and R2 are higher than impedances ZSC1 and ZSC2, so that all current i0 flows through the first and second superconducting coils 1 and 2 and not though the other portions. This is shown in a diagram of an equivalent circuit in FIG. 4.

In this case, as first and second superconducting coils 1 and 2 include windings of oxide superconducting lines wound in opposite directions, a magnetic field in the direction of the coil axis is canceled and only a self-generating magnetic field remains. At the time, as described in T. Okazald, P. D. Evans, "A Fault Current Limiter in Toroidal Form to Maximize Effective Jc", *Proceedings of ASC* 98, the magnetic field is generated in parallel with a surface of a superconductor and attains to a minimum value. A critical current value of the oxide superconductor is significantly affected by a value and direction of the magnetic field. As disclosed in FIG. 7 of the above mentioned reference, an externally applied magnetic field results in a smaller critical current value than in the case of the self-generating magnetic field. Particularly, if the magnetic field is applied perpendicularly to the surface of the oxide superconductor, even smaller critical current value is attained than in this case where the magnetic field is applied in parallel with the surface of the oxide superconductor. Thus, when the magnetic field generated including the self-generating magnetic field is parallel with the surface of the oxide superconductor as described above, a decrease in the critical current value is smaller. Thus, in the fault current limiter of the present invention, a high critical current value is maintained during normal operation while avoiding the impact of the magnetic field.

A critical current value of second superconducting coil 2 is set slightly smaller than that of first superconducting coil 1 such that second superconducting coil 2 first quenches when the current increases to exceed a set fault current value, that is, when an applied current value exceeds the critical current value of second superconducting coil 2 in the case of the accident. Resistor R2 is set slightly higher than impedance ZSC2 in the superconducting state. Accordingly, when second superconducting coil 2 quenches, impedance ZSC2 of the second superconducting coil at the time is higher than a resistance value of resistor R2. Thus, the current is immediately shunted and flows to resistor R2. Then, current values of first superconducting coil 1 and second superconducting coil 2 differ. As a result, a canceling condition of the magnetic field, which has been satisfied during normal operation, fails to be satisfied.

Figure 5:
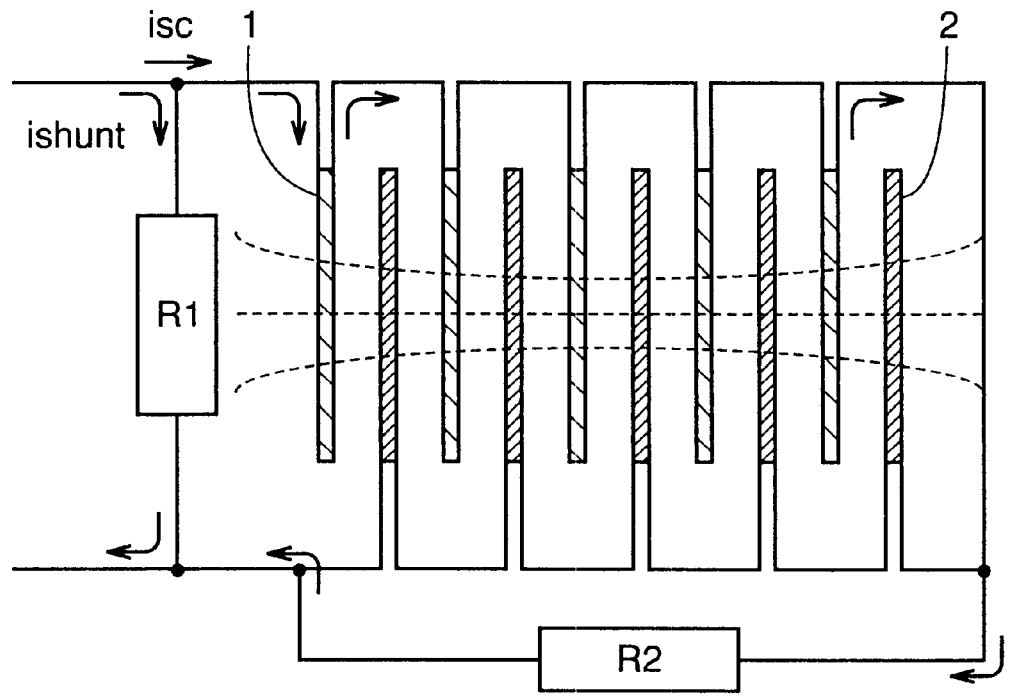
FIG. 5 is a diagram showing a direction of current applied by the effect of a magnetic field generated by an accident and corresponding to FIG. 2.
Figure 6:
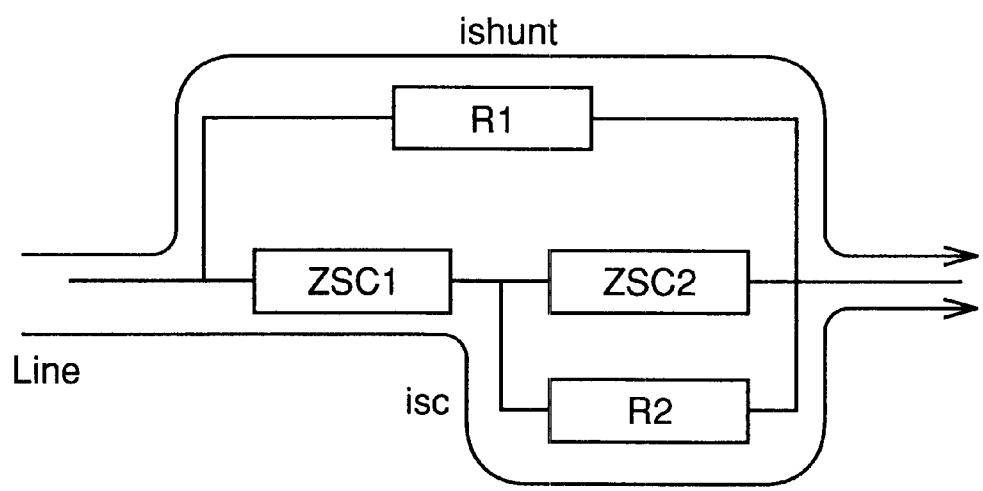
FIG. 6 is a diagram of an equivalent circuit showing a direction of an applied current and corresponding to FIG. 5.

As shown by dotted lines in FIG. 5, the magnetic field is generated in the direction of the coil axis of first and second superconducting coils 1 and 2, that is, in the direction perpendicular to the surface of the superconductor. As shown by dotted lines in FIG. 3, the magnetic field is generated in parallel with the surface of the superconductor of each of first and second superconducting coils 1 and 2 during normal operation. When the magnetic field is generated in the direction of the coil axis, that is, in the direction perpendicular to the surface of the superconductor by the accident, a resistance value of the superconductor forming the coil significantly increases. Thus, a resistance value of second superconducting coil 2 further increases. In addition, first superconducting coil 1 is rapidly brought into the normal conducting state by the magnetic field in the perpendicular direction. As a result, a current value of first superconducting coil 1 and the magnetic field in the perpendicular direction increase a resistance value of first superconducting coil 1. At the time, first superconducting coil 1 is brought into the normal conducting state by application of the magnetic field. As the magnetic field is applied uniformly to first superconducting coil 1, transition to the normal conducting state of first superconducting coil 1 is not limited to one portion. In addition, unlike a thermal phenomenon, it is not limited to one portion because of an electromagnetic phenomenon. Thus, in the case of the accident, a main current flows through first superconducting coil 1 and resistor R2. The main current is shown as isc in FIG. 6. To prevent an excessive current from flowing through the superconductor, depending on required parameters of the overall system, resistor R1 is connected in parallel so that the main current is shunted. FIG. 6 shows a current ishunt in the shunted state.

As described above, according to the present invention, a superconducting fault current limiter capable of ensuring a sufficient impedance at the time of the accident without using an iron core is provided. In addition, the canceling condition of the magnetic field can completely be satisfied during normal operation.

It is noted that, in the above described embodiment, the superconducting coils are arranged in a ring form such that the coil axis is circular, that is, the superconducting coils are arranged in a toroidal form. However, the superconducting coils may be arranged in a solenoid form to produce the above described function and effect of the present invention.

A similar effect may be produced even when the second superconducting coil is not connected in series with the first superconducting coil and only the second superconducting coil is short-circuited. In this case, although the second coil is not connected in series with the first coil, a current flows through the second superconducting coil by induction in the normal state to cancel, not completely, the magnetic field by the first coil. When an excessive current is caused, the second coil quenches and a resistance is generated. Thus, the magnetic field by the first coil cannot completely be canceled. As a result, the magnetic field is applied also to the first coil, bringing the entire coil into the normal conducting state.

In the above described embodiment, the current is applied uniformly to the superconducting coils if the superconducting coils are arranged in the toroidal form. However, in the toroidal form arrangement, a distance between two adjacent superconducting coils is small on the inner side and large on the outer side of the ring in the toroidal form. The superconducting coils must be insulated with reference to the inner side. Thus, there are unnecessarily large spaces on the outer side. In addition, a large space is formed at the central portion of a circle (a ring) in the toroidal form. As a result, such toroidal form arrangement is not efficient in terms of space.

However, the toroidal form arrangement generally increases a symmetric property of the magnetic field or the like, and advantageously equalize the current values of the superconducting coils. In addition, the toroidal form arrangement makes it possible to apply the same magnetic field to the superconducting coils, so that equally allotted load current is applied to each coil.

However, as distances between two adjacent superconducting coils differ on the inner and outer sides of the ring in the toroidal form arrangement as described above, the magnetic field on the inner side is strong and that on the outer side is weak. Thus, the uneven magnetic field prevents the superconductor from performing its function to the full. For example, as intensities of the magnetic field on the inner and outer sides differ, a critical current density at a portion close to a central point of the circle (the ring) of the superconducting coils is small, whereas a critical current density at a portion far from a central point of the circle is high. As a result, a current value of the entire superconducitng coil is controlled by the portion close to the circle, and a relatively small current flows. Therefore, in the toroidal form arrangement, although the current can be applied equally to the superconducting coils, it is difficult to make the magnetic field inside the superconducting coil uniform.

Second Embodiment

To solve the problem associated with the above described toroidal form arrangement, in the present embodiment, a fault current limiter including first and second superconducting coils arranged in a solenoid form will be described.

Figure 7:
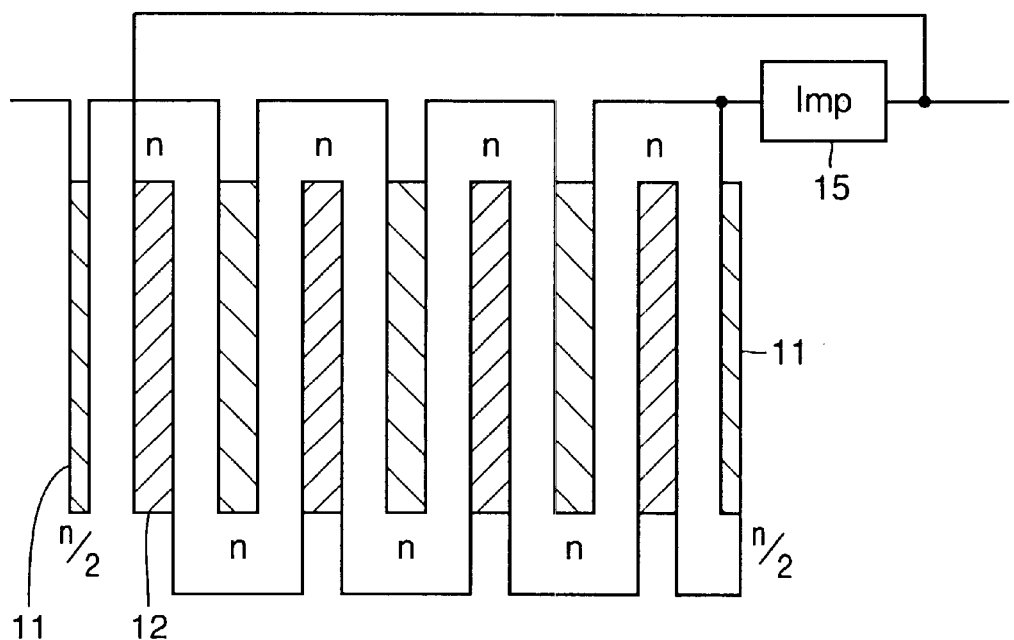
FIG. 7 is a diagram showing an arrangement of superconducting coils in a second embodiment of the superconducting fault current limiter according to the present invention.

As shown in FIG. 7, the fault current limiter includes a plurality of first superconducting coils 11 and a plurality of second superconducting coils 12, for example, in the form of plain pancake coils including windings of superconducting lines. FIG. 7 shows side surfaces of the first and second supeconducting coils 11 and 12. Further, first and second superconducting coils 11 and 12 are arranged in a cylindrical shape, that is, in a solenoid form such that a coil axis passing through central point of coils is linear. First superconducting coils 11 and second superconducting coils 12 are alternately arranged. First superconducting coils 11 and second superconducting coils 12 include windings of superconducting lines wound in opposite directions. First and second superconducting coils 11 and 12 are electrically connected in series. First and second superconducting coils 11 and 12 are plain superconducting coils each having an oxide superconductor spirally arranged on a plane. Spiral oxide superconducting thin films may be formed on either side of a substrate in a ring shape to provide a double pancake coil. Alternatively, first and second superconducting coils 11 and 12 may be formed by a double pancake coil which is formed by a general oxide superconducting line. A configuration other than the double pancake coil may be employed.

As shown in FIG. 7, first superconducting coils 11 are connected in series and second superconducting coils 12 are connected in series, which are in turn connected in series. A shunt impedance 15 is connected in parallel with serially connected plurality of second superconducting coils 12. Shunt impedance 15 is higher than an overall impedance of second superconducting coils 12 in the superconducting state. An overall impedance of second superconducting coils 12 is extremely small in the superconducting state. A critical current value of second superconducting coils 12 is slightly lower than that of first superconducting coils 11. In FIG. 7, the number of turns of first superconducting coil 11 is n/2 at an end in the direction of the coil axis, and n at an intermediate portion. The number of turns of second superconducting coil 12 is n. The number of turns and ampere turn of first superconducting coil 11 at the end in the direction of the coil axis are half that of the other coils to provide symmetry in the solenoid form for the canceling condition of the magnetic field during normal operation.

In the above described embodiment, the operations during normal operation and at the time of the accident are the same as those described with reference to FIGS. 3 to 6 in the first embodiment.

Figure 8:
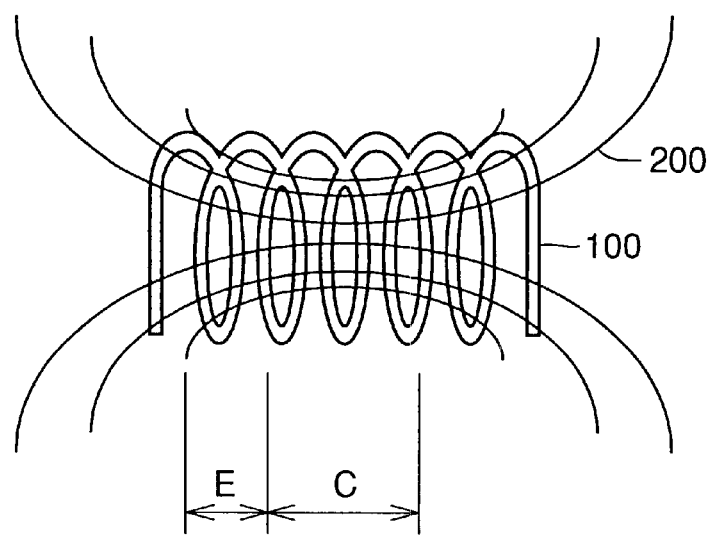
FIG. 8 is a diagram showing a magnetic flux line of a general coil in a solenoid form.

However, generally, an uneven magnetic field is generated at the end in the direction of the coil axis in the solenoid coil. As shown in FIG. 8, a coil conductor 100 is wound in a solenoid form. In this case, a flux line 200 is uniform at an intermediate portion C of solenoid coil 100, but uneven at end E. Thus, as shown in FIG. 7, when first and second superconducting coils 11 and 12 are arranged in the solenoid form, a uniform magnetic field is applied to the superconductor of the superconducting coil arranged in the intermediate portion, whereas a magnetic field different from that at the intermediate portion is applied to the superconductor of the superconducting coil arranged at the end of the coil axis. Thus, a critical current value, a resistance value when the fault current limiter is in operation or the like of the superconductor arranged at the end of the coil axis differ from those of the superconductor arranged at the intermediate portion. As a result, the uniform magnetic field in the case of the toroidal form described in the first embodiment is not applied to each superconducting coil, so that a performance of the fault current limiter is lower in the solenoid form than in the toroidal form.

In the solenoid form, however, a uniform magnetic field is applied to each superconducting coil at least at the intermediate portion in the direction of the coil axis, so that equal current loads are achieved. In addition, the magnetic field in each superconducting coil is uniform. The solenoid form does not require an unnecessarily large insulating space as compared with the case of the toroidal form, so that the space is more efficiently utilized. In other words, a more compact fault current limiter is provided by the solenoid form arrangement.

Third Embodiment

Figure 9:
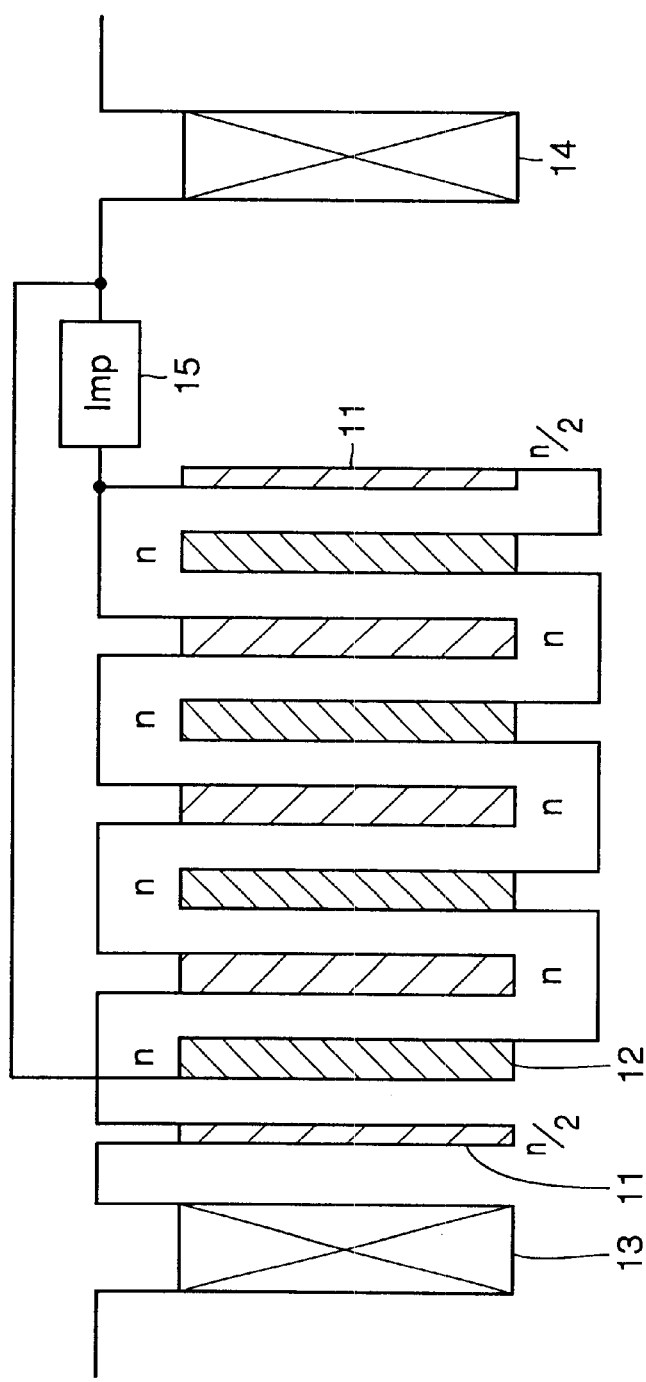
FIG. 9 is a diagram showing an arrangement of superconducting coils in a third embodiment of the superconducting fault current limiter according to the present invention.

Unlike the arrangement shown in FIG. 7, a fault current limiter shown in FIG. 9 has correcting coils 13 and 14 serially connected to a first superconducting coils 11 at ends in the direction of the coil axis. These correcting coils 13 and 14 may be a normal conducting coil or superconducting coil which is not related to a current-limiting operation. First and second superconducting coils 11 and 12 positioned at the intermediate portion of the coils arranged in the solenoid form are related to the current-limiting operation.

Though the magnetic field is not uniform at the ends in the direction of the coil axis in the solenoid form, correcting coils 13 and 14 are arranged to generate a magnetic field of a prescribed intensity to alleviate the unevenness of the magnetic field to an acceptable level. When superconducting coils are arranged as correcting coils 13 and 14, they are formed of superconductors having critical current values higher than a maximum current flowing through the fault current limiter, that is, a critical current value of first and second superconducting coils 11 and 12. Such structure prevents the superconductor including correcting coils 13 and 14 from being brought into the normal conducting state at a current value lower than that of the superconductor including the first and second superconducting coils 11 and 12 at the time of the accident causing excessive current flow. Thus, correcting coils 13 and 14 are not related to the current-limiting operation.

Correcting coils 13 and 14 are most simply arranged by repeating a structure similar to that of first and second superconducting coils 11 and 12. However, correcting coils 13 and 14 are not limited to a plain coil in a disc shape as applied to first and second superconducting coils 11 and 12.

In addition, as shown in FIG. 9, first and second superconducting coils 11 and 12 may be connected in series with correcting coils 13 and 14 to allow the same current value. However, a portion of the current may be shunted from that flowing through first and second superconducting coils 11 and 12 forming the fault current limiter, so that only the portion of the current may be applied to correcting coils 13 and 14. In this case, the number of turns of correcting coils 13 and 14 may be increased, so that the same ampere turn as that of first and second superconducting coils 11 and 12 is provided.

In the above described embodiment, the correcting coils are not related to the current-limiting operation. However, a superconducting coil having a specification different from first and second superconducting coils 11 and 12 arranged at the central portion in the direction of the coil axis may be employed as correcting coils 13 and 14. When the critical current value at the end in the direction of the coil axis decreases approximately by 20%, for example, a width or cross sectional area of the superconductor forming the correcting coils is increased approximately by 20%, so that the correcting coil has a performance similar to that of the superconducting coil arranged at the intermediate portion. Thus, the correcting coils are related to the current-limiting operation. As a result, a more compact current limiter is provided.

Although the first and second superconducting coils are arranged in cylindrical shape such that the coil axis is linear in the above described embodiment, the fault current limiter of the present invention is not limited to such solenoid form. For example, the first and second superconducting coils may be arranged on a curve, bent line or closed line. In this case, as in the case of the end in the direction of the coil axis of the solenoid form, an uneven magnetic field is generated at a portion having a relatively small curvature. The operation of the fault current limiter can be stabilized also in this portion by arranging the normal conducting coil or superconducting coil not related to the current-limiting operation or by arranging the superconducting coil with enhanced performance of the superconductor related to the current-limiting operation as in the above described embodiment. Thus, the operation of the fault current limiter is stabilized by arranging the correcting coil at a portion with uneven magnetic field in various structures of the fault current limiter having the first and second superconducting coils arranged such that the coil axis is linear, a curve, a bent line or a close line or the like.

It is noted that the current-limiting operation can be performed also in the fault current limiter according to the third embodiment as in the fault current limiter of the first embodiment to provide a function and effect of the present invention.

Fourth Embodiment

A fault current limiter will now be described with reference to FIG. 10.

Figure 10:
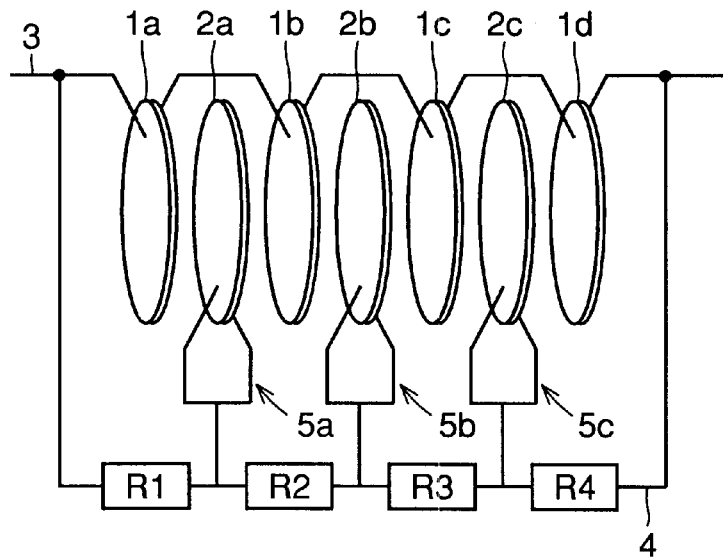
FIG. 10 is a schematic diagram showing a fourth embodiment of the superconducting fault current limiter according to the present invention.

Referring to FIG. 10, the fault current limiter includes first plain superconducting coils $1a$ to $1d$ and second plain superconducting coils $2a$ to $2c$ including windings of superconducting lines. First superconducting coils $1a$ to $1d$ are electrically connected to a power supply line 3. Second superconducting coils $2a$ to $2c$ respectively form circuits $5a$ to $5c$ which are independently short-circuited. Each of second superconducting coils $2a$ to $2c$ is provided between two of first superconducting coils $1a$ to $1d$ to generate magnetic fields in directions opposite to those of the magnetic fields generated by first superconducting coils $1a$ to $1d$. Second superconducting coils $2a$ to $2c$ are connected to a parallel circuit 4 which is connected in parallel with first superconducting coils $1a$ to $1d$ at respective portions. Parallel circuit 4 includes resistors R1 to R4 for fixing potentials of second superconducting coils $2a$ to $2c$.

Figure 11:
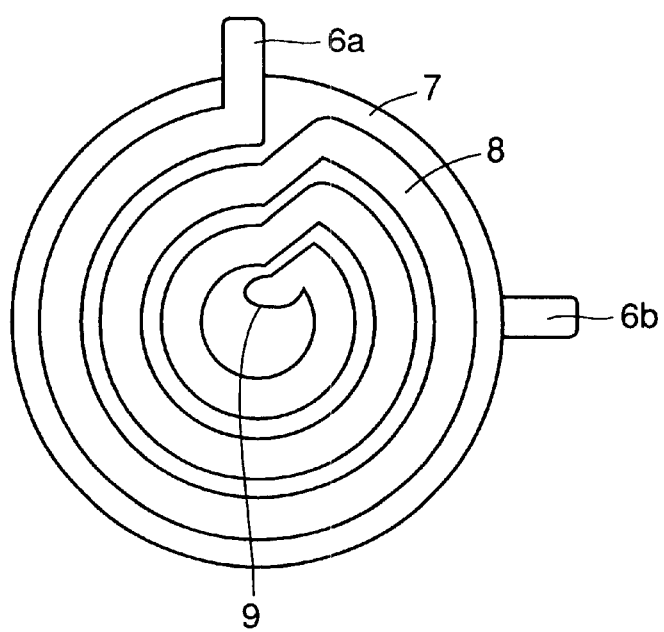
FIG. 11 is a schematic plan view showing a superconducting coil used in a fault current limiter.
Figure 12:
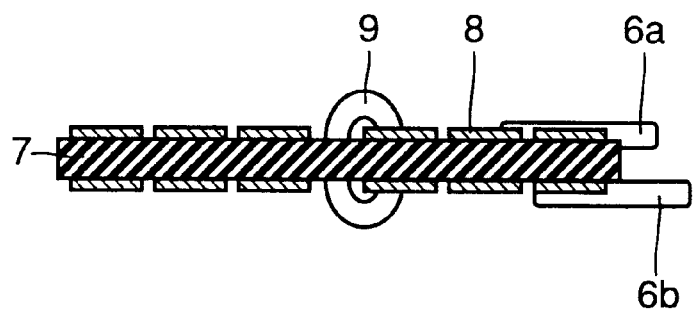
FIG. 12 is a schematic cross sectional view showing the superconducting coil in FIG. 11.

Plain superconducting coils as shown in FIGS. 11 and 12 are used first and second superconducting coils $1a$ to $1d$ and $2a$ to $2c$.

Referring to FIGS. 11 and 12, the superconducting coil includes an insulating substrate 7 and a superconductor films 8. Superconductor films 8 are spirally arranged on front and back surfaces of insulating substrate 7. Superconductor films 8 on the front and back surfaces of insulating substrate 7 are electrically connected by a connection 9. Terminals $6a$ and $6b$ are formed at both ends of the electric path including superconductor films 8 and connection 9.

Now, a function of the fault current limiter shown in FIG. 10 will be described. When a current flows through power supply line 3, first superconducting coils $1a$ to $1d$ generate magnetic fields. Then, current is induced to second superconducting coils $2a$ to $2c$ to generate magnetic fields in the direction to cancel the magnetic fields generated by first superconducting coils $1a$ to $1d$. Here, ampere turns of first and second superconducting coils $1a$ to $1d$ and $2a$ to $2c$ do not completely match because of leakage flux or the like. However, the ampere turns can be made close to the same value by decreasing a distance between the first and second superconducting coils, for example, a distance between first superconducting coil $1a$ and second superconducting coil $2a$ as much as possible. Even if the magnetic fields generated by first superconducting coils $1a$ to $1d$ cannot completely be canceled, if the ampere turns are made closer to the same value as described above, the magnetic fields by first superconducting coils $1a$ to $1d$ are nearly canceled by second superconducting coils $2a$ to $2c$. Thus, an effect similar to that of the first to third embodiments of the fault current limiter of the present invention is provided.

More specifically, ampere turns of first superconducting coils $1a$ to $1d$ and second superconducting coils $2a$ to $2c$ are made approximately at the same value by the above described arrangement during normal operation. Thus, the magnetic field of fault current limiter becomes minimum. First and second superconducting coils $1a$ to $1d$ and $2a$ to $2c$ are all in the superconducting state and their impedances are minimum.

On the other hand, when an excessive current flows through first superconducting coils $1a$ to $1d$ by an accident, the excessive current flows also through second superconducting coils $2a$ to $2c$. If the critical current value of second superconducting coils $2a$ to $2c$ is slightly smaller than that of first superconducting coils $1a$ to $1d$, second superconducting coils $2a$ to $2c$ first quenches and are brought into the normal conducting state. The resistance value of second superconducting coils $2a$ to $2c$ becomes considerably higher than that in the superconducting state, so that a current cannot be applied for canceling the magnetic field generated by first superconducting coils $1a$ to $1d$. Thus, a canceling condition of the magnetic field fails to be satisfied. As a result, a magnetic field is generated in the direction of the coil axis of first and second superconducting coils $1a$ to $1d$ and $2a$ to $2c$, that is, in the direction perpendicular to the surface of superconductor 8 (see FIGS. 11 and 12). Thus, the critical current value of the superconductor of first superconducting coils $1a$ to $1d$ decreases and the current-limiting operation is rapidly performed. The magnetic field can instantly be applied to a large area unlike local heat generation. The application of the magnetic field rapidly brings the entire superconductor into the normal conducting state, and therefore unevenness in a property of the superconductor is not a problem. Thus, an impedance of the fault current limiter for restricting an excessive current flow caused by the accident is ensured by a quenching resistance value of first superconducting coils $1a$ to $1d$. Therefore, unlike the conventional fault current limiter, an iron core is not necessary to ensure the impedance. As a result, a more compact fault current limiter with reduced weight is provided.

In addition, as first superconducting coils $1a$ to $1d$ have a large quenching resistance by the current of the coil and the magnetic field, an overall impedance for restricting the excessive current flow caused by the accident can be determined by the quenching resistance value of first superconducting coils $1a$ to $1d$.

Referring to FIG. 10, the current supplied from power supply line 3 flows only through first superconducting coils 1a to 1d which are coils for restricting current flow, and not through second superconducting coils 2a to 2c which are coils for canceling magnetic fields. As second superconducting coils 2a to 2c form circuits 5a to 5c which are short-circuited, an induced current generated when the current supplied from power supply line 3 flows through first superconducting coils 1a to 1d flows through circuits 5a to 5c for each of second superconducting coils 2a to 2c. Although first superconducting coils 1a to 1d and second superconducting coils 2a to 2c are inductively coupled, the ampere turns thereof do not completely match because of an exciting current or leakage flux as described above. However, by adjusting the arrangement of first and second superconducting coils 1a to 1d and 2a to 2c, the canceling condition of the magnetic field can be satisfied to the extent to avoid a practical problem.

Unlike the first embodiment of the present invention, a current from the power supply line does not directly flow through second superconducting coils 2a to 2c as described above. Thus, when a high voltage is applied to the fault current limiter at the time of the accident, the number of portions applied with the high voltage can be reduced as compared with the case of the fault current limiter described in the first embodiment. As a result, a design for insulation of the fault current limiter is simplified, and the fault current limiter is more readily designed. In addition, the structure of the fault current limiter can be simplified.

As second superconducting coils 2a to 2c are connected to power supply line 3 through resistors R1 to R4 which are high resistors for fixing a potential, potentials of second superconducting coils 2a to 2c are fixed to the potentials respectively determined by resistors R1 to R4 with respect to a voltage applied to the fault current limiter. Accordingly, floating electric charges are prevented from accumulating in second superconducting coils 2a to 2c to cause concentration of the magnetic field when a high voltage is applied, for example, at the time of the accident. As a result, the problem associated with breakdown voltage of second superconducting coils 2a to 2c can be avoided.

Further, by changing resistances of resistors R1 to R4 for fixing a potential, fixed potentials of second superconducting coils 2a to 2c can arbitrarily be adjusted.

It is noted that an excessive current needs not be applied to resistors R1 to R4 for fixing the potential because they are merely used to fix potentials of second superconducting coils 2a to 2c. Thus, resistors having high resistance values may be used as these resistors R1 to R4.

The fault current limiter will now be described with reference to FIG. 13.

Figure 13:
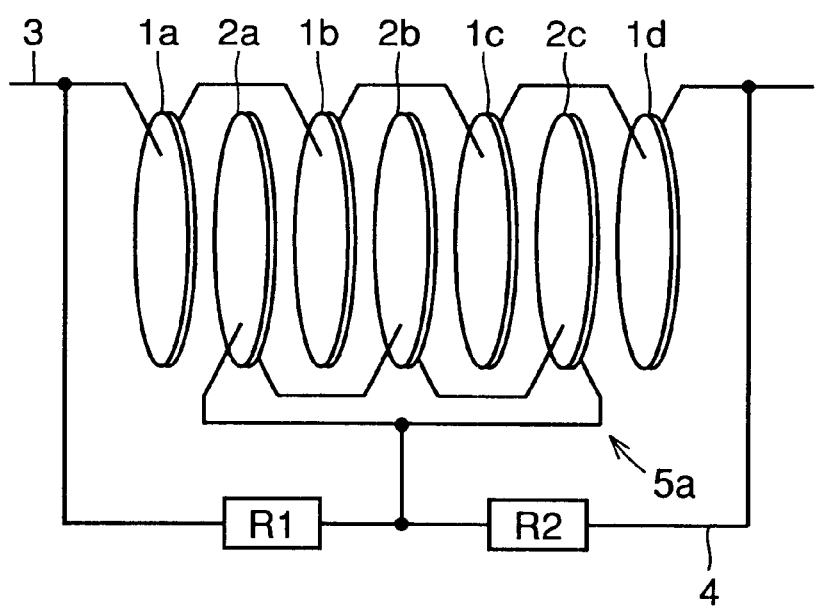
FIG. 13 is a schematic diagram showing a first modification of the fault current limiter shown in FIG. 10.

Referring to FIG. 13, the fault current limiter basically has a structure similar to that of the fault current limiter shown in FIG. 10. It is noted that second superconducting coils 2a to 2c are electrically connected in series to form a circuit having one end and the other end. One end and the other end are short-circuited to form a single circuit 5a, which is a closed circuit. Circuit 5a is connected to a parallel circuit 4 at one portion. Circuit 5a is connected to first superconducting coils 1a to 1d through resistors R1 and R2 for fixing a potential.

With such structure, when one of second superconducting coils 2a to 2c forming circuit 5a quenches, a resistance value of the quenched superconducting coil increases, so that a current value of circuit 5a decreases. In this case, the canceling condition of the magnetic field in the fault current limiter fails to be satisfied, and the magnetic field is generated in the direction of the coil axis of first and second superconducting coils 1a to 1d and 2a to 2c, that is, in the direction perpendicular to the surface of the superconductor. As a result, critical current values of first and second superconducting coils 1a to 1d and 2a to 2c are decreased by the magnetic field. Then, a current-limiting operation is rapidly performed in the fault current limiter. As described above, by providing a single circuit 5a having serially connected second superconducting coils 2a to 2c, the effect of the quench of one of plurality of second superconducting coils 2a to 2c can rapidly be transferred to other second superconducting coils. Therefore, a stable current-limiting operation is surely performed in the entire fault current limiter in a short period of time.

As circuit 5a is electrically connected to first superconducting coils 1a to 1d through resistors R1 and R2 such that a potential is fixed with respect to first superconducting coils 1a to 1d, floating electric charges are prevented from locally accumulating in circuit 5a when a high voltage is caused by the accident. Thus, the problem associated with the dielectric breakdown is avoided in circuit 5a.

The fault current limiter will now be described with reference to FIG. 14.

Figure 14:
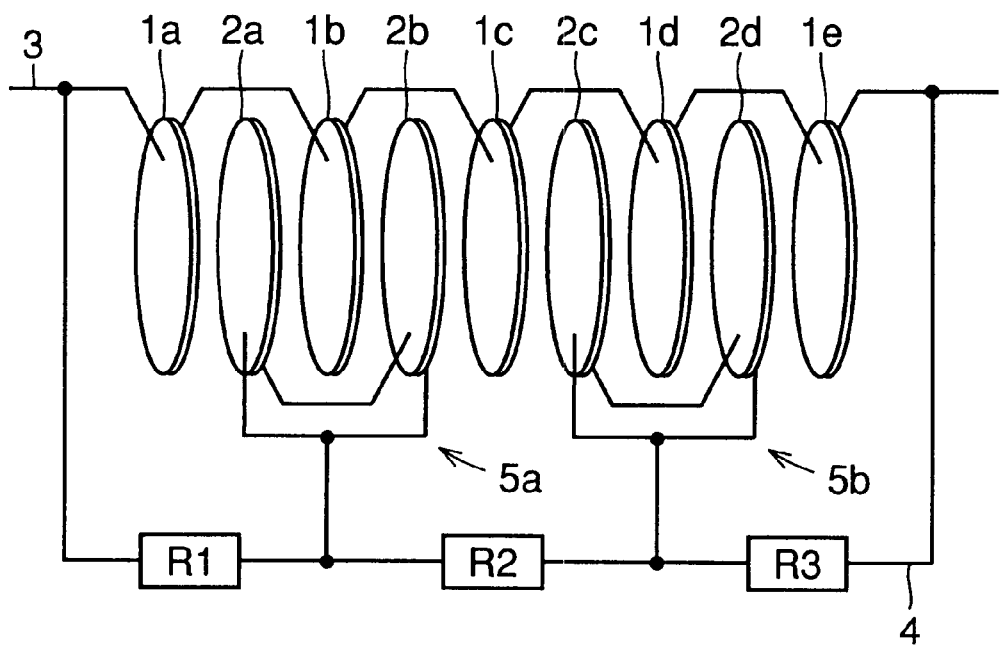
FIG. 14 is a schematic diagram showing a second modification of the fault current limiter shown in FIG. 10.

Referring to FIG. 14, the fault current limiter basically includes a structure similar to that of the fault current limiter shown in FIG. 10. It is noted that the fault current limiter shown in FIG. 14 includes a closed circuit 5a as a first circuit having second superconducting coils 2a and 2b as the third and fourth superconducting coils which are electrically connected in series. In addition, the fault current limiter includes a closed circuit 5b as a second circuit having second superconducting coils 2c and 2d as the fifth and sixth superconducting coils which are electrically connected in series. Closed circuits 5a and 5b are electrically connected to first superconducting coils 1a to 1e through resistors R1 to R3 at respective portions. Thus, second superconducting coils 2a to 2d has potentials fixed with respect to first superconducting coils 1a to 1e. Such structure also provides an effect similar to that in the case of the fault current limiter shown in FIG. 10.

In the fault current limiter shown in FIG. 13, the problem associated with the dielectric breakdown may not be avoided because second superconducting coils 2a and 2c positioned at ends of circuit 5a have excessively high potential differences with respect to adjacent first superconducting coil 1a or 1d, with reference to FIG. 13. As shown in FIG. 14, however, second superconducting coils 2a to 2d are divided into a plurality of groups, each group forming circuits 5a and 5b, and potentials of respective circuits 5a and 5b are fixed. Thus, the effect of the quench caused to one of second superconducting coils 2a to 2d can rapidly be transferred to other coils. At the same time, the problem associated with the excessive potential difference between first superconducting coils 1a and 1d and second superconducting coils 2a and 2c is avoided.

In addition, the above described structure enables circuits 5a and 5b to be separately designed, so that the fault current limiter can more freely be designed.

In the fault current limiter shown in FIG. 14, circuits 5a and 5b are electrically connected to first superconducting coils 1a to 1e such that potentials thereof are fixed with respect to first superconducting coils 1a to 1e. Accordingly, floating electric charges are prevented from locally accumulating in circuits 5a and 5b including a plurality of superconducting coils when the high voltage is caused by the accident. As a result, the problem associated with the dielectric breakdown is avoided in circuits 5a and 5b.

It is noted that when the fault current limiter is a fault current limiter for a low voltage, such resistors R1 to R4 may not be necessary.

Although first and second superconducting coils 1a to 1e and 2a to 2d are arranged in a cylindrical shape such that the coil axis thereof is linear, they may be arranged such that the coil axis is a curve or circular.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fault current limiter, comprising:
    first and second superconducting coils including windings of superconducting lines, said first superconducting coil being electrically connected in series with said second superconducting coil and said first superconducting coil and said second superconducting coil generating magnetic fields in opposite directions by application of currents; and
    a component selected from a group consisting of a resistor and an inductor, said component being electrically connected in parallel with said second superconducting coil.

2. The fault current limiter according to claim 1, wherein said first and second superconducting coils are arranged in a cylindrical shape such that a coil axis is linear.

3. The fault current limiter according to claim 2, further comprising a third coil connected in series with said first and second superconducting coils and arranged at an end in a direction of said coil axis.

4. The fault current limiter according to claim 3, wherein said third coil is a normal conducting coil including a winding of a normal conducting line.

5. The fault current limiter according to claim 3, wherein said third coil is a superconducting coil including a winding of a superconducting line.

6. The fault current limiter according to claim 5, wherein a critical current value of said third coil is greater than those of said first and second superconducting coils.

7. The fault current limiter according to claim 5, wherein a cross sectional area of said superconducting line forming said third coil is larger than those of said superconducting lines forming said first and second superconducting coils.

8. The fault current limiter according to claim 3, wherein said third coil has an ampere turn approximately the same as those of said first and second superconducting coils.

9. The fault current limiter according to claim 1, wherein said first and second superconducting coils are arranged such that a coil axis is a curve.

10. The fault current limiter according to claim 9, further comprising a third coil connected in series with said first and second superconducting coils and arranged at an end in a direction of a coil axis.

11. The fault current limiter according to claim 10, wherein said third coil is a normal conducting coil including a winding of a normal conducting line.

12. The fault current limiter according to claim 10, wherein said third coil is a superconducting coil including a winding of a superconducting line.

13. The fault current limiter according to claim 12, wherein a critical current value of said third coil is greater than those of said first and second superconducting coils.

14. The fault current limiter according to claim 12, wherein a cross sectional area of said superconducting line forming said third coil is larger than those of said superconducting lines forming said first and second superconducting coils.

15. The fault current limiter according to claim 10, wherein said third coil has an ampere turn approximately the same as those of said first and second superconducting coils.

16. The fault current limiter according to claim 9, further comprising a third coil connected in series with said first and second superconducting coils and arranged at an end in a direction of said coil axis, and a fourth coil connected in series with said first and second superconducting coils and arranged at a portion of said curve having a relatively small curvature.

17. The fault current limiter according to claim 16, wherein said third or fourth coil is a normal conducting coil including a winding of a normal conducting line.

18. The fault current limiter according to claim 16, wherein said third or fourth coil is a superconducting coil including a winding of a superconducting line.

19. The fault current limiter according to claim 18, wherein a critical current value of said third or fourth coil is greater than those of said first and second superconducting coils.

20. The fault current limiter according to claim 18, wherein a cross sectional area of said superconducting line forming said third or fourth coil is larger than those of said superconducting lines forming said first and second superconducting coils.

21. The fault current limiter according to claim 16, wherein said third or fourth coil has an ampere turn approximately the same as those of said first and second superconducting coils.

22. The fault current limiter according to claim 9, further comprising a third coil connected in series with said first and second superconducting coils and arranged at a portion of said curve having a relatively small curvature.

23. The fault current limiter according to claim 22, wherein said third coil is a normal conducting coil including a winding of a normal conducting line.

24. The fault current limiter according to claim 22, wherein said third coil is a superconducting coil including a winding of a superconducting line.

25. The fault current limiter according to claim 24, wherein a critical current value of said third coil is greater than those of said first and second superconducting coils.

26. The fault current limiter according to claim 24, wherein a cross sectional area of said superconducting line forming said third coil is larger than those of said superconducting lines forming said first and second superconducting coils.

27. The fault current limiter according to claim 22, wherein said third coil has an ampere turn approximately the same as those of said first and second superconducting coils.

28. The fault current limiter according to claim 1, wherein said first and second superconducting coils are arranged in a ring form such that a coil axis is circular.

29. The fault current limiter according to claim 1, wherein a resistance value of said resistor or an inductance of said inductor is adjustable.

30. The fault current limiter according to claim 1, wherein said first superconducting coil and said second superconducting coil are alternately arranged.

31. The fault current limiter according to claim 1, wherein said superconducting coil includes a superconductor spirally arranged on a plane.

32. The fault current limiter according to claim 1, wherein said first superconducting coil and said second superconducting coil include windings of superconducting lines wound in opposite directions.

33. The fault current limiter according to claim 1, wherein said first superconducting coil and said second superconducting coil include windings of superconducting lines wound in the same direction, and arranged to generate magnetic fields in opposite directions.

34. The fault current limiter according to claim 1, wherein a critical current value of said first superconducting coil is higher than that of said second superconducting coil.

35. The fault current limiter according to claim 1, wherein said superconducting line includes an oxide superconductor.

36. A fault current limiter, comprising first and second superconducting coils including windings of superconducting lines, said second superconducting coil being short-circuited and arranged to generate magnetic fields in a direction opposite to that of magnetic fields generated by said first superconducting coil.

37. The fault current limiter according to claim 36, wherein said second superconducting coil includes a plurality of superconducting coils each being independently short-circuited.

38. The fault current limiter according to claim 37, wherein said second superconducting coil is connected to said first superconducting coil through a component selected from a group consisting of a resistor and an inductor.

39. The fault current limiter according to claim 38, wherein a resistance value of said resistor or an inductance of said inductor is adjustable.

40. The fault current limiter according to claim 36, wherein said second superconducting coil is electrically connected to said first superconducting coil such that a potential thereof is fixed with respect to said first superconducting coil.

41. The fault current limiter according to claim 36, wherein said second superconducting coil includes a plurality of superconducting coils, said plurality of superconducting coils are electrically connected in series to form a circuit having one end and the other end, and said one and the other ends are short-circuited.

42. The fault current limiter according to claim 41, wherein said circuit is electrically connected to said first superconducting coil such that a potential thereof is fixed with respect to said first superconducting coil.

43. The fault current limiter according to claim 36, wherein said second superconducting coil includes third to sixth superconducting coils, said third and fourth superconducting coils are electrically connected in series to form a first circuit having one end and the other end, said one and the other ends of said first circuit are short-circuited, said fifth and sixth superconducting coils are electrically connected in series to form a second circuit having one end and the other end, and said one and the other ends of said second circuit are short-circuited.

44. The fault current limiter according to claim 43, wherein said first and second circuits are electrically connected to said first superconducting coil such that a potential thereof is fixed with respect to said first superconducting coil.

45. The fault current limiter according to claim 36, wherein said first and second superconducting coils are arranged in a cylindrical shape such that a coil axis is linear.

46. The fault current limiter according to claim 36, where said first and second superconducting coils are arranged such that a coil axis is a curve.

47. The fault current limiter according to claim 36, wherein said first and second superconducting coils are arranged in a ring form such that a coil axis is circular.

48. The fault current limiter according to claim 36, wherein said first superconducting coil and said second superconducting coil are alternately arranged.

49. The fault current limiter according to claim 36, wherein said superconducting coil includes a superconductor spirally arranged on a plane.

50. The fault current limiter according to claim 36, wherein said first superconducting coil and said second superconducting coil include windings of superconducting lines wound in opposite directions.

51. The fault current limiter according to claim 36, wherein said first superconducting coil and said second superconducting coil include windings of superconducting lines wound in the same direction, and arranged to generate magnetic fields in opposite directions.

52. The fault current limiter according to claim 36, wherein a critical current value of said first superconducting coil is higher than that of said second superconducting coil.

53. The fault current limiter according to claim 36, wherein said superconducting line includes an oxide superconductor.

54. A fault current limiter, comprising first and second superconducting coils including windings of superconducting lines, said first superconducting coil being electrically connected in series with said second superconducting coil, said first superconducting coil and said second superconducting coil generating magnetic fields in opposite directions by application of currents, being arranged in a ring form such that a coil axis is circular and being alternately arranged, and said superconducting coil including an oxide superconductor spirally arranged on a plane.

55. A fault current limiter, comprising first and second superconducting coils including windings of superconducting lines, said first superconducting coil being electrically connected in series with said second superconducting coil, said first superconducting coil and said second superconducting coil generating magnetic fields in opposite directions by application of currents, being arranged in a cylindrical shape such that a coil axis is linear and being alternately arranged, and said superconducting coil including an oxide superconductor spirally arranged on a plane, and further comprising a third coil connected in series with said first and second superconducting coils and arranged at an end in a direction of said coil axis.

56. A fault current limiter, comprising first and second superconducting coils including windings of superconducting lines, said first and second superconducting coils being arranged in a cylindrical shape such that a coil axis is linear, said second superconducting coil being short-circuited and arranged to generate a magnetic field in a direction opposite to that of a magnetic field generated by said first superconducting coil, said second superconducting coil including third to sixth superconducting coils, said third and fourth superconducting coils being electrically connected in series to form a first circuit having one end and the other end, said one and the other ends of said first circuit being short-circuited, said fifth and sixth superconducting coils being electrically connected in series to form a second circuit having one end and the other end, said one and the other ends of said second circuit being short-circuited, and said superconducting coil including an oxide superconductor spirally arranged on a plane.

* * * * *

UNITED STATES PATENT AND TRADEMARK OFFICE
CERTIFICATE OF CORRECTION

PATENT NO.   : 6,337,785 B1
DATED        : January 8, 2002
INVENTOR(S)  : Toru Okazaki It is certified that error appears in the above-identified patent and that said Letters Patent is hereby corrected as shown below:

<u>Title page,</u>
Item [30], Foreign Application Priority Data, delete "Jan. 28, 1999 (JP) 11-019820"

Signed and Sealed this

Eighteenth Day of May, 2004

JON W. DUDAS
*Acting Director of the United States Patent and Trademark Office*